US006702051B2

(12) United States Patent
Chu et al.

(10) Patent No.: US 6,702,051 B2
(45) Date of Patent: Mar. 9, 2004

(54) DETACHABLE TRANSMISSION MECHANISM FOR A WHEEL CHAIR

(76) Inventors: Simon Chu, 111 Railroad Ave., Glenside, PA (US) 19038; Chih-Chin Hsieh, 7F, No. 16-5, Jian Kang Road, Taipei (TW); Tseng-Chien Lin, No. 169, Nan-Ya Street, Hsinchu (TW)

( * ) Notice: Subject to any disclaimer, the term of this patent is extended or adjusted under 35 U.S.C. 154(b) by 0 days.

(21) Appl. No.: 10/228,939

(22) Filed: Aug. 28, 2002

(65) Prior Publication Data

US 2004/0007400 A1 Jan. 15, 2004

(30) Foreign Application Priority Data

Jul. 12, 2002 (TW) ...................................... 91210658 U

(51) Int. Cl.[7] ................................................ B62M 7/14

(52) U.S. Cl. ...................... 180/13; 180/907; 180/304.1; 280/210

(58) Field of Search ............................... 180/11, 12, 13, 180/907; 280/210, 304.1; D12/131; 192/69.4; 403/1

(56) References Cited

U.S. PATENT DOCUMENTS

| | | | | | |
|---|---|---|---|---|---|
| 3,023,825 | A | * | 3/1962 | Rabjohn | 180/15 |
| 3,387,681 | A | * | 6/1968 | Rabjohn | 180/13 |
| 3,794,132 | A | * | 2/1974 | Moon | 180/13 |
| 4,386,672 | A | * | 6/1983 | Coker | 180/13 |
| 5,016,720 | A | * | 5/1991 | Coker | 180/13 |
| 5,125,468 | A | * | 6/1992 | Coker | 180/13 |
| 5,494,126 | A | * | 2/1996 | Meeker | 180/13 |
| 5,651,422 | A | * | 7/1997 | Casali | 180/13 |

FOREIGN PATENT DOCUMENTS

| | | | | | |
|---|---|---|---|---|---|
| EP | 382873 | A | * | 8/1990 | A61G/5/04 |
| GB | 2134056 | A | * | 8/1984 | B60K/1/00 |
| JP | 2001070358 | A | * | 3/2001 | A61G/5/04 |
| JP | 2003019165 | A | * | 1/2003 | A61G/5/02 |

* cited by examiner

*Primary Examiner*—Lesley D. Morris
*Assistant Examiner*—Daniel Yeagley
(74) *Attorney, Agent, or Firm*—Troxell Law Office PLLC

(57) ABSTRACT

A detachable transmission mechanism for a wheel chair includes a control unit, an engaging unit, a battery unit and a transmission device. The original front wheels of the wheel chair can be detached and the hub and the pivot part are mounted to both the upper and lower frames of the wheel chair. The battery unit can be fixed to the wheel chair under the seat thereof. When a control switch is turned on, the driving wheel can rotate in a forward or a reversed direction with the wheel chair being capable of moving forward or backward. By turning the handle, a follower wheel at the bottom of the wheel chair can be rotated to allow the wheel chair making a turn.

14 Claims, 5 Drawing Sheets

DETACHABLE TRANSMISSION MECHANISM FOR A WHEEL CHAIR

BACKGROUND OF THE INVENTION

1. Field of the Invention

The present invention relates to a detachable transmission mechanism for a wheel chair and particularly to an electric transmission mechanism used in a wheel chair with which a used wheel chair can be attached by way of DIY (Do It Yourself) so as to become an electric wheel chair.

2. Description of Related Art

The wheel chair was specially developed for handicapped or slowly moved aged persons and while a user sits in the wheel chair and pushes both lateral large wheels with both hands actuating grip rings coaxially connecting with the large wheels, the movement of the wheel chair can be obtained purposely. A weak person or a hand-hindered person resulting from illness or wound usually is unable to exert a force to the large wheels so that it is necessary to ask some other persons for gripping the handles at rear side of the wheel chair before the wheel chair can be moved. Hence, the conventional wheel chair has to be assisted by the user himself or any other person in order to meet the basic requirement of movement.

Accordingly, the so called electric wheel chair has been developed and the feature of the electric wheel chair is a transmission mechanism is provided under a "h" shaped seat, that is, one of two rear wheels is designed as the driving wheel and the other one rear wheel is the follower wheel so as to constitute a basis of moving forward. Two front wheels are controlled by a stir stem located at the armrests being shifted to front, rear, left or right so that the wheel chair can move toward a direction desired by the user. Although the conventional wheel chair has a good and easily operated control device, there still are following deficiencies: 1) the transmission mechanism of the electric wheel chair has to be driven with the electric power and it becomes unmoved in case of the electric power is depleted and the basic function of manual drive has lost; 2) In order to obtain the effect of speed differential (that is, the inner side rear wheel has a less rotational speed than the outer side rear wheel) for the two rear wheels and to avoid turning over or a risk of being unable to turn during the wheel chair making a turn, a sophisticate speed change box has to be mounted between the two rear wheels so that it increases the complicity of the transmission mechanism of the wheel chair; and 3) due to both the body and the transmission mechanism of the conventional electric wheel chair being made with complication, the production cost thereof is pretty high so that the retail price thereof is much more expensive and is not possible to become prevalent among handicapped and motion hindered persons.

SUMMARY OF THE INVENTION

An object of the present invention is to provided a detachable transmission mechanism for a wheel chair. The detachable transmission mechanism includes a control unit, an engaging unit, a battery unit and a transmission device. The original front wheels of the wheel chair can be detached and the hub and the pivot part are mounted to both the upper and lower frames of the wheel chair. The battery unit can be fixed to the wheel chair under the seat thereof. When a control switch is turned on, the driving wheel can rotate in a forward or a reversed direction with the wheel chair being capable of moving forward or backward. By turning the handle, a follower wheel at the bottom of the wheel chair can be rotated to allow the wheel chair making a turn.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
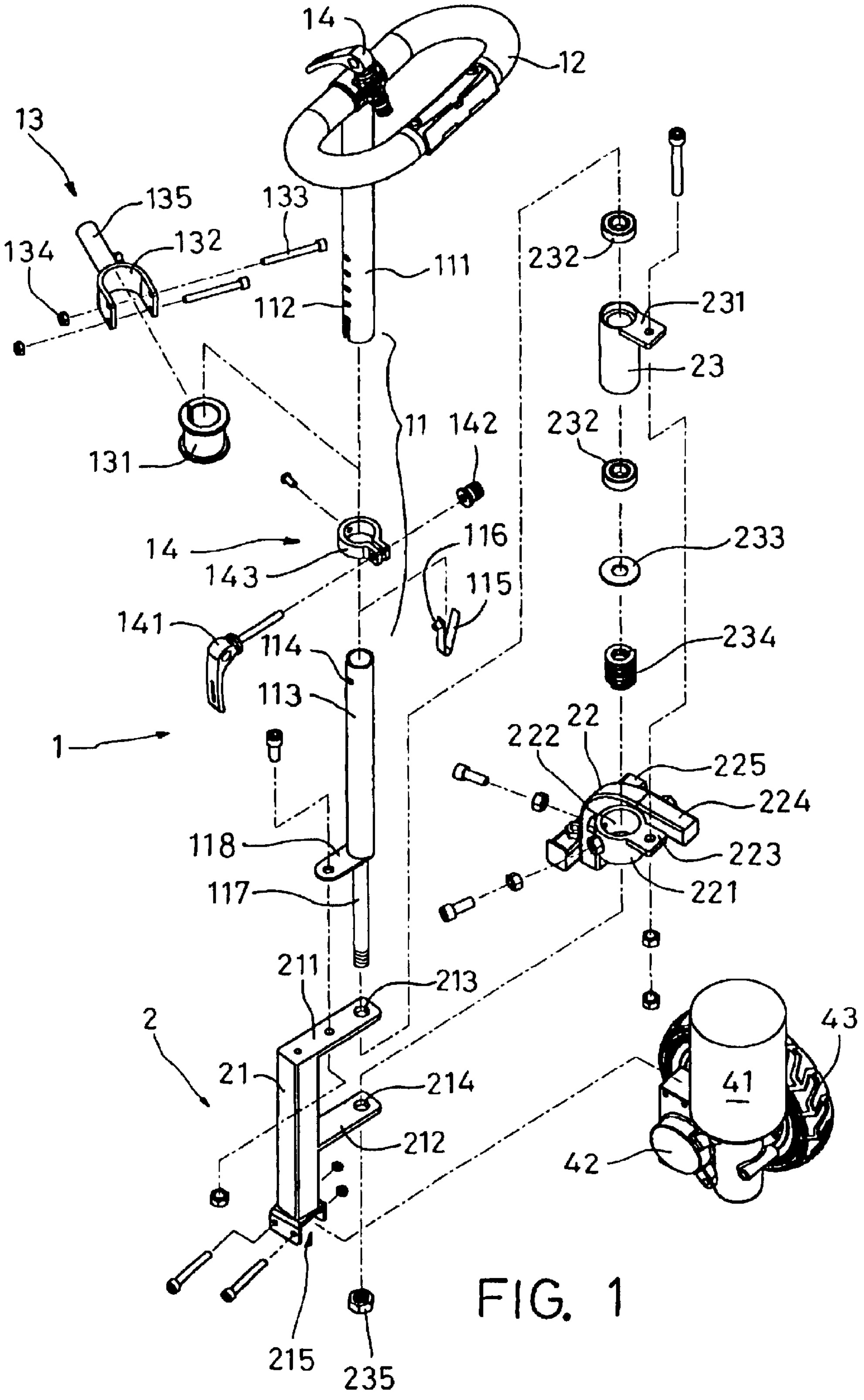
FIG. 1 is an exploded perspective view of a detachable transmission mechanism for a wheel chair according to the present invention.
Figure 2:
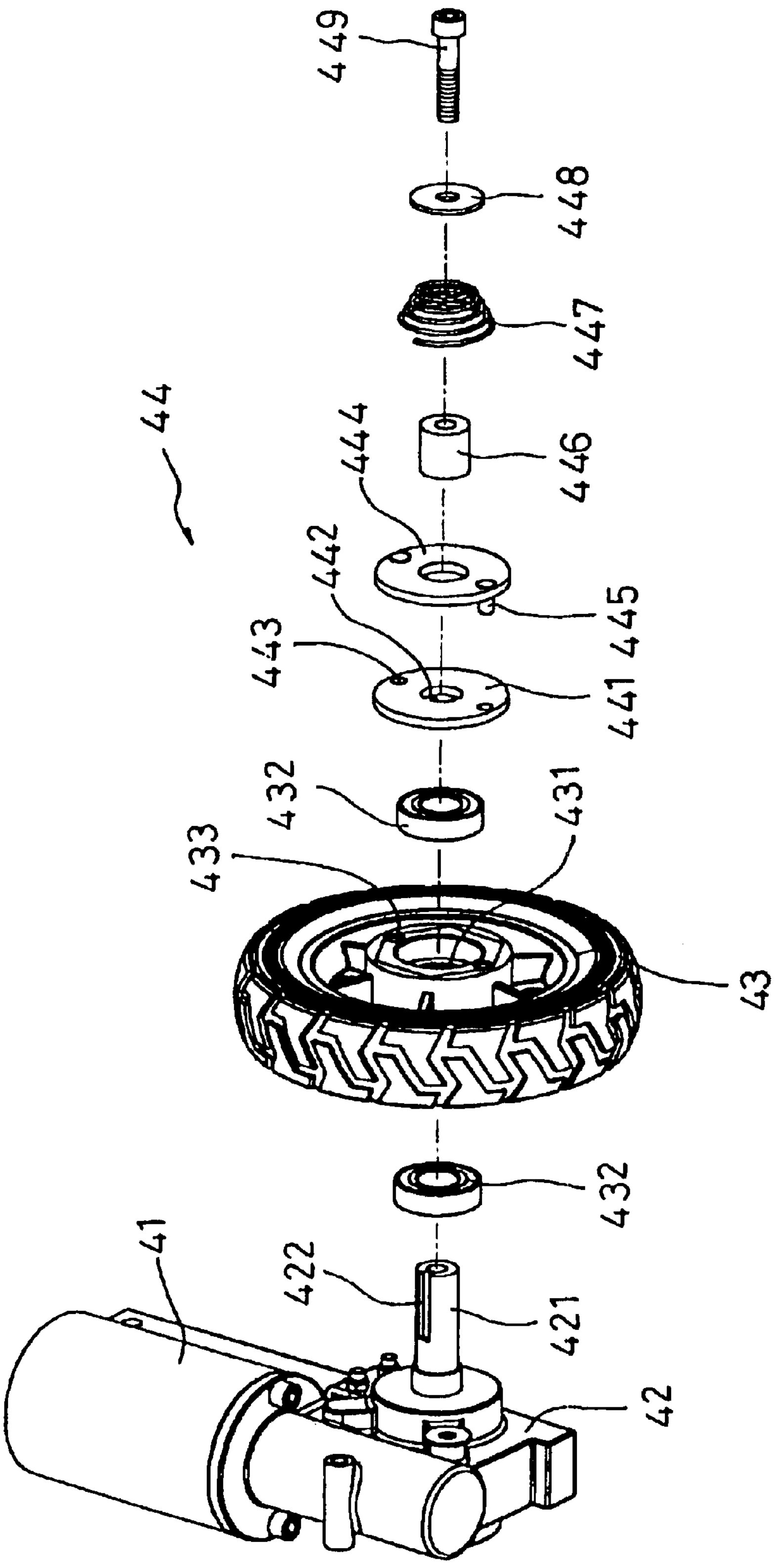
FIG. 2 is an exploded perspective view of a manual control device and a driving device according to the present invention.
Figure 3:
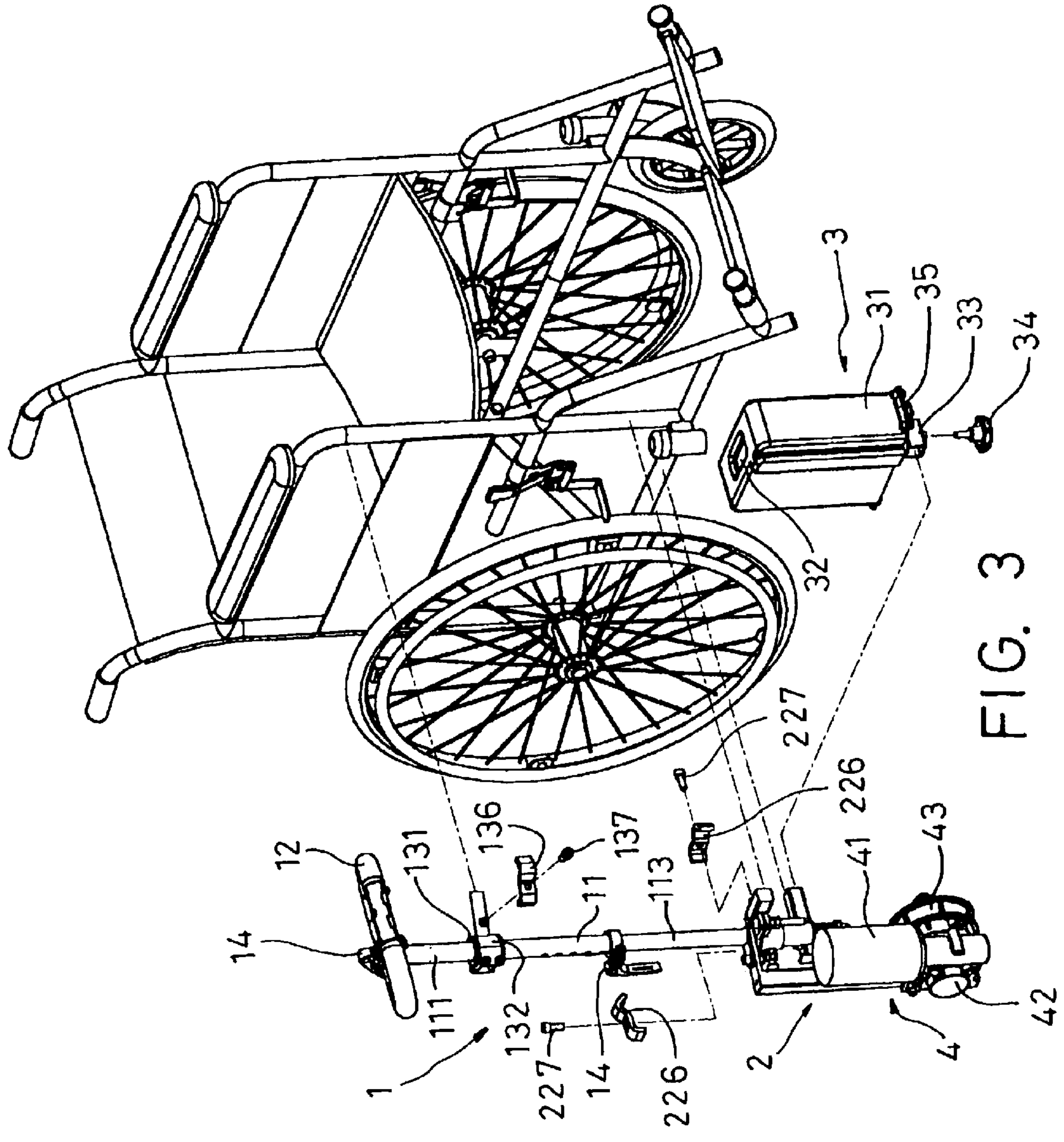
FIG. 3 is a perspective view illustrating the transmission mechanism of the present invention being ready to be assembled to a wheel chair.
Figure 4A:
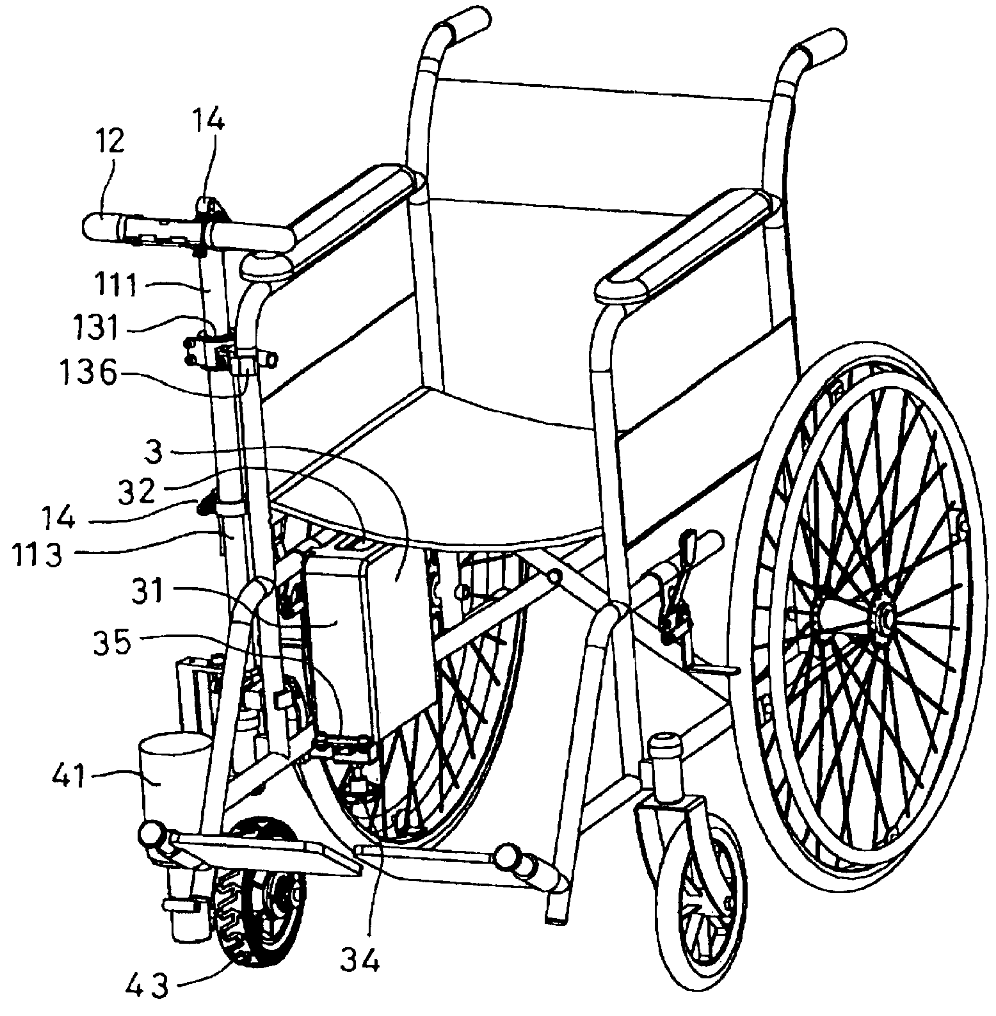
FIGS. 4A and 4B are assembled perspective view of the transmission mechanism and the wheel chair shown in FIG. 3 with two different projection angles.
Figure 4B:
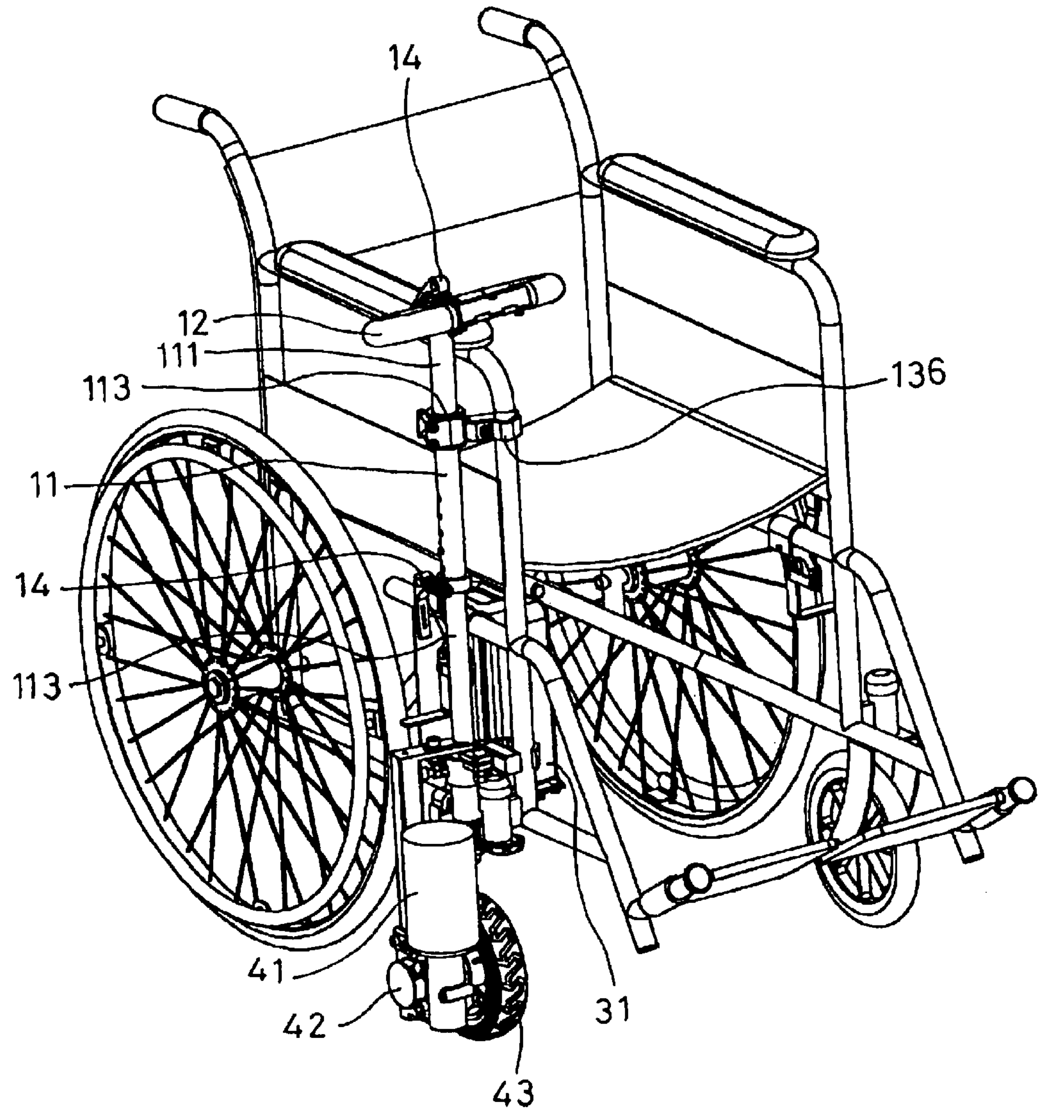

Referring to FIGS. 1 through 4A and 4B, the detachable transmission mechanism for a wheel chair consists of a control unit 1, an engaging unit 2, a battery unit 3 and a transmission device 4.

Wherein, the control unit 1 is mainly to provide the entire transmission device 4 the ability to move and turn with a vertical shaft 11 at the top thereof engaging with a handle 12 being held and operated by a user and at the bottom thereof being connected to the engaging unit 2. The vertical shaft 11 passes through a fixed hub 13 on the frame of the wheel chair so that the vertical shaft is able to rotate. The hub 13 consists of a sleeve 131 contained inside a U-clip 132 and at least one screw 133 can pass through the U-clip 132 and tightened with a nut 134 so that the U-clip 132 can be associated with the screw 133 firmly. A pivot lever 135 is extended from the bottom of the U-clip 132 to be connected to the wheel chair frame. By using a screw 137 passing through a pressing piece 136 and then fixing onto the pivot lever 135, the frame can be enclosed and held at one lateral side of the wheel chair.

Nevertheless, to accommodate body types of different users, the vertical shaft 11 has a function of being adjustably lifted or descended. A plurality of positioning holes 112 are lined up on an outer pipe 111 and the lower part of the outer pipe 111 fits with an inner pipe 113, which has a button hole 114 at the opening thereof is disposed corresponding to the positioning holes 112. And a V-shaped elastic strip 115, inserted into the opening of the inner pipe, has an abrupt button 116 extends outward laterally from the button hole 114 and engages with one of the positioning holes 112 selectively so as to lift the outer pipe 111. Moreover, a fastener 14 is provided at the joint between the outer pipe 111 and the handle 12 and also the joint between the outer pipe 111 and the inner pipe 113 respectively. By stirring an engaging stem 141 and relatively turning a nut 142, a loose/tightness effect on a pipe clamp 143 and thus the handle 12 can be adjusted to a suitable angle and provides better comfort during operating the transmission mechanism. Furthermore, a tight fit between the outer pipe 111 and the inner pipe 113 can be obtained instead of becoming loose and disconnected from each other easily.

The engaging unit 2 consists of a connecting frame 21 and a fixing base 22. The connecting frame 21 has a F shape and there are two limit plates 211, 212 extending outward from a lateral side thereof with an axial hole 213, 214 on each of the limit plates. An axial rod 117 extends downward from the bottom of the inner pipe 113 to pass through the axial holes 213, 214. Furthermore, a joining plate 118 extends laterally from the bottom of the inner pipe 113 and is attached to and fastened to the limit plate 211 with a screw and a nut such that the vertical shaft 11 is supported on top of the connecting frame and thus form a relative movement with the connecting frame. The bottom of the connecting frame 21 has an inversed U-shaped joining part 215, which is connected to the output unit 42 of the transmission device 4 by a screw rod.

The fixing base 22 is disposed between the two limit plates 211, 212 and provided with a fitting ring 221 corresponding to the two axial holes 213, 214. A central bore 222 of the fitting ring 221 receives a sleeve 23 and the sleeve 23 is attached with an engaging plate 231 such that the engaging plate and the ring plate 223 can be joined to each other firmly. The sleeve 23 at the upper and the lower end thereof is inserted with a bearing 232 respectively and the axial rod 117 can pass through the bearings 232 for being able to rotate with facility. The axial rod 117 further passes through a washer 233, a spring 234 and the lower limit plate 212 and then fastened to a connecting piece 235 so as to form a shock absorption system and accommodate to the rugged and rough road surface. In order to join the fixing base 22 to the wheel chair firmly, it is possible to provide a pivotal part, for instance, a base lever 224 and a support 225 extending in a way of being perpendicular to each other but disposed in different levels such that the base lever 224 and the support 225 can be joined to two perpendicular frames underneath the wheel chair respectively. Furthermore, by making use of two urging plates 226 being passed through by a screw 227 and engaging with the base lever 224 and support 225 respectively, the frames can be clamp commonly and the fixing base 22 can be fixed to a lateral side of the wheel chair at the lower part thereof.

Further, in order to fix the battery unit 3 in position, please refer to FIG. 3 again. A battery 32 shown is received in a case 31 and the bottom of the case 31 is attached with a lever cap 33 for the support lever passing through. By pressing the knob 34 tightly onto the support lever 225, this will make the battery unit 3 fixed under the seat of the wheel chair and the contact poles 35 thereof provide the power needed by the transmission device 4.

The transmission device 4 consists of a motor 41, an output unit 42 and a driving wheel 43. Wherein, the output unit 42 can be a turbine reducer, a pulley or a gear in practice. Referring to FIG. 2 again, when the motor 41 starts to run, it will make the output shaft 421, which extends from the output unit 42 laterally to turn in the forward or revered direction according to the operation of a user. Thus, the driving wheel 43, which is connected to the output shaft, can move forward or backward. The characteristic of the present invention is that the driving wheel 43 is connected with a manual control device 44, that is, a shaft hole 431 in the driving wheel 43 is inserted with a respective bearing 432 at both ends thereof and an outer flange surrounding the shaft hole 431 provides at least two engaging holes 433. An engaging groove 422 is provided on the output shaft 421 and extends longitudinally to pass over the two bearings 432 and a follower plate 441. The follower plate 441 is provided with an engaging bolt 442 and a through hole 443 corresponding to the engaging groove 422 and the engaging hole 433 so that the follower plate 441 can rotate synchronously with the driving wheel 43. An engaging plate 444 is attached to the outer wall of the follower plate 441. The engaging plate 444 is pierced with a relay pipe 446 and has an engaging projection 445 corresponding one of the engaging holes 433 so that the engaging projection 445 can pass though and fit with the engaging hole 433 and the engaging plate 444 can rotate with the driving wheel 43. Furthermore, on the other side of the engaging plate 444, a spring 447 and a washer 448 are placed one after another for a fixing bolt 449 passing through and being fastened to the output shaft 421. When the battery 32 in the battery unit 3 is depleted, the driving wheel 43 will not be able to turn. At this moment, the only thing has to be done by the user is to hold and then pull the engaging plate 444 outward along the relay pipe 446. Under this circumstance, the spring 447 is compressed and the engaging projection 445 is free from both the engaging hole 433 and through hole 443 so that the engaging plate 444 is unable to rotate with the driving wheel 43 and the driving wheel is therefore in a state of no traction. Hence, the user can push the grip ring of the wheel and make the two large wheels at the two lateral sides of the wheel chair to rotate and move forward and the driving wheel 43 is in a state of idling and acts as a driven wheel.

Referring to FIGS. 3, 4A and 4B again, the detachable transmission mechanism of this invention has been built up as a master structure and a power supply part by way of modularized design. Thus, in case of the detachable transmission mechanism of the present invention being assembled with an existing wheel chair, a small wheel at the front lateral side of the wheel chair has to be removed first and then the pivot lever 135, base lever 224 and support lever 225 are respectively attached to the upper and lower frame of the wheel chair. Next, both the pressing piece 136 and the urging plate 226 is used for enclosing and holding the frame such that the master structure can be fixed to a lateral side of the wheel chair. After that, the battery unit 3 and the support lever 225 are joined to each other so as to locate the power supply part in position before the assembly job is completed. Hence, once the control switch on the handle 12 is operated, the driving wheel 43 can move forward or backward. In case of making a turn, the user just has to hold and rotate the handle 12 and the driving wheel 43 can turn to another direction extremely conveniently.

It is appreciated that the effectiveness of the present invention resides in the transmission mechanism can be associated with an existing wheel chair used in ordinary families, hospitals, nursing home or rehabilitation center and it is not necessary to acquire an expensive electric wheel chair. Moreover, when the power of the battery unit is consumed, adjusting the manual device with hands will make the driving wheel not able to be actuated by the engaging plate and become in a state of idling. The wheel chair is then changed to the manual control and can move by pushing with hands. Furthermore, the present invention does not need complicated design of speed change box and wheel chair frame so that the production cost can be greatly reduced and the goal for popularity and low cost can be reached advantageously and it is impossible for the conventional electrical wheel chair can achieve effectively. Furthermore, the vertical shaft and the handle can be adjusted to lift and turn to accommodate for the build types of different users so that the user can obtain utmost comfort due to human engineering consideration in the present invention.

While the invention has been described with reference to the a preferred embodiment thereof, it is to be understood that modifications or variations may be easily made without departing from the spirit of this invention, which is defined by the appended claims.

What is claimed is:

1. A detachable transmission mechanism for a wheel chair, comprising:

a control unit, having a vertical shaft connecting with a handle, passing through a hub and having an axial rod extending from a lower part thereof;

an engaging unit, including a connecting frame with two extending outward limit plates at a lower end of the vertical shaft and a fixing base disposed between two extending outward limit plates, each of the two limit plates having an axial hole being passed through by the axial rod with a joining part being located at a bottom thereof, the fixing base having a fitting ring for receiving and joining a sleeve with the axial rod being connected to the sleeve and passing through the limit plates for connecting with a connecting piece, and the fitting ring at a lateral side thereof having a pivotal part;

a battery unit, further comprising a case and at least a battery inside the case, being fixedly attached to the pivotal part; and a transmission device, further comprising an electric motor and an output unit, the output unit being connected to the pivotal part so to form a movement relation and an output shaft extending from a lateral side thereof to connect with a driving wheel;

wherein, once original front wheels of the wheel chair are detached and the hub and the pivot part are mounted to an upper and a lower frame of the wheel chair, the battery unit can be fixed under a seat of the wheel chair; when a control switch is turned on, the driving wheel can rotate in a forward or a reversed direction with the wheel chair moving forward or backward; and by turning the handle, the driving wheel at a bottom of the wheel chair can be rotated so as to allow the wheel chair making a turn.

2. The detachable transmission mechanism for a wheel chair as defined in claim 1, wherein the hub is a sleeve placed in a U-shaped clip and a pivot lever extending from the a lateral side thereof connects with frames of the wheel chair and fixes the hub in position to rotate the vertical shaft.

3. The detachable transmission mechanism for a wheel chair as defined in claim 2, wherein the pivot lever and a pressing piece enclose and hold the frame of the wheel chair by way of threaded fastening.

4. The detachable transmission mechanism for a wheel chair as defined in claim 1, wherein the vertical shaft is formed by an outer pipe fitting with an inner pipe, the outer pipe having a plurality of positioning holes and the inner pipe at an end thereof having an elastic strip with an abrupt button extending outward laterally from the inner pipe for being selectively inserted into one of the positioning holes and the outer pipe being able to lift or descend adjustably.

5. The detachable transmission mechanism for a wheel chair as defined in claim 1, wherein a fastener is provided between the handle and a top of the vertical shaft so that by stirring an engaging stem and turning a nut, a pipe clamp connecting with the handle can be loosened or tightened so as to adjust an inclination angle of the handle and to fix the handle.

6. The detachable transmission mechanism for a wheel chair as defined in claim 4, wherein a lower end of the outer pipe has a fastener to prevent the two pipes from being apart from each other.

7. The detachable transmission mechanism for a wheel chair as defined in claim 1, wherein a joining plate extending laterally from the bottom of the vertical shaft fixedly connects with the connecting frame to form a relation of movement link.

8. The detachable transmission mechanism for a wheel chair as defined in claim 1, wherein the pivotal part, which is located at a lateral side of the fitting ring, is composed of a base lever and support lever, which are perpendicular mutually but are disposed at different level for being joined to the two frames at the lower part of the wheel chair.

9. The detachable transmission mechanism for a wheel chair as defined in claim 8, wherein the base lever and the support lever enclose and are fixed to another frame of the wheel chair with a urging plate respectively by way of threaded fastening.

10. The driving device in a wheel chair as defined in claim 8, wherein the support lever is connected to a lever cap at a bottom of the battery unit.

11. The detachable transmission mechanism for a wheel chair as defined in claim 1, wherein the hub at two ends thereof is inserted with a bearing respectively for the axial rod passing through.

12. The detachable transmission mechanism for a wheel chair as defined in claim 1, wherein a washer and spring are disposed between the hub and the lower limit plate for the axial rod passing through so as to form a shock absorption system with the spring being compressed and extended.

13. The detachable transmission mechanism for a wheel chair as defined in claim 1, further comprises a manual control unit with a follower plate and an engaging plate being positioned sequentially at an outer side of the driving wheel, an engaging groove being arranged at an outer side of the output shaft passing through an axial shaft hole of the driving wheel and in turn engaging with an engaging bolt corresponding to the follower plate, the engaging plate towards the direction of the driving wheel having at least two projections inserted into a plurality of through holes and engaging holes surrounding the follower plate and shaft hole so that the engaging plate can move synchronously with the driving wheel and the engaging plate fits with a relay pipe is provided with a spring and a washer positioned sequentially so at to allow a fixing bolt to pass through and to be fastened to the output shaft;

whereby, by pulling the engaging plate outwards along the relay pipe and thus compressing the spring, the engaging projections are released from the engaging hole and through hole so as to connectively contact with the surface of the follower plate with the driving wheel losing an effect of traction and becoming idle.

14. The detachable transmission mechanism for a wheel chair as defined in claim 13, wherein the shaft hole at both ends thereof is attached with a bearing respectively.

* * * * *